United States Patent
Watanabe (10) Patent No.: US 7,693,640 B2
(45) Date of Patent: Apr. 6, 2010

(54) LATERAL ACCELERATION SENSOR BREAKDOWN DETECTION DEVICE

(75) Inventor: Satoki Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 359 days.

(21) Appl. No.: 11/812,549

(22) Filed: Jun. 20, 2007

(65) Prior Publication Data

US 2008/0015764 A1 Jan. 17, 2008

(30) Foreign Application Priority Data

Jun. 21, 2006 (JP) ............................ 2006-172006

(51) Int. Cl.
- *B60T 8/24* (2006.01)
- *G06G 1/00* (2006.01)
- *G06F 7/00* (2006.01)
- *G06F 17/00* (2006.01)

(52) U.S. Cl. .................... 701/72; 701/71; 340/669; 340/670; 303/139; 180/197

(58) Field of Classification Search .................... 701/71, 701/72; 340/669, 670, 671; 303/139; 180/197
See application file for complete search history.

(56) References Cited

U.S. PATENT DOCUMENTS

| | | | | |
|---|---|---|---|---|
| 5,124,921 | A | * | 6/1992 | Jonner et al. .................... 701/70 |
| 5,212,640 | A | * | 5/1993 | Matsuda ............................ 701/34 |
| 5,276,624 | A | * | 1/1994 | Ito et al. ........................... 701/72 |
| 5,707,117 | A | * | 1/1998 | Hu et al. ..................... 303/122.08 |
| 6,035,251 | A | * | 3/2000 | Hac et al. .......................... 701/70 |
| 6,079,513 | A | * | 6/2000 | Nishizaki et al. ............. 180/402 |
| 6,122,577 | A | * | 9/2000 | Mergenthaler et al. ......... 701/34 |
| 6,144,904 | A | * | 11/2000 | Tseng ............................. 701/34 |
| 6,202,009 | B1 | * | 3/2001 | Tseng ............................. 701/34 |
| 6,254,204 | B1 | * | 7/2001 | Hara et al. .................... 303/183 |
| 6,276,188 | B1 | * | 8/2001 | Horiuchi ...................... 73/1.37 |
| 6,285,933 | B1 | * | 9/2001 | Kohler et al. .................. 701/34 |
| 6,499,559 | B2 | * | 12/2002 | Mc Cann et al. ............. 180/446 |
| 6,564,131 | B2 | * | 5/2003 | Sebastian et al. .............. 701/41 |
| 6,623,089 | B2 | * | 9/2003 | Amberkar ................... 303/146 |
| 6,658,342 | B1 | * | 12/2003 | Hac ............................. 701/70 |

(Continued)

FOREIGN PATENT DOCUMENTS

JP 07-40040 B2 5/1995

(Continued)

*Primary Examiner*—Khoi Tran
*Assistant Examiner*—Jaime Figueroa
(74) *Attorney, Agent, or Firm*—Westerman, Hattori, Daniels & Adrian, LLP (57) ABSTRACT

A lateral G sensor breakdown detection device configured to carry out a breakdown determination control that determines that the lateral G sensor has a breakdown when the difference between the actual lateral G acting on a four wheel drive vehicle measured by the lateral G detection sensor installed on the vehicle and the estimated lateral G estimated and calculated from predetermined parameters that express the condition of the vehicle; while the vehicle is turning when the rotation speed of the outer wheel is equal to or less than the rotation speed of the inner wheel and when the actual lateral G is less than the estimated lateral G and the difference is greater than a predetermined value, the breakdown determination control is suspended.

4 Claims, 6 Drawing Sheets

U.S. PATENT DOCUMENTS

| | | | |
|---|---|---|---|
| 6,694,225 B2 * | 2/2004 | Aga et al. | 701/1 |
| 6,701,237 B2 * | 3/2004 | Sebastian et al. | 701/43 |
| 7,366,598 B2 * | 4/2008 | Ono et al. | 701/34 |
| 2003/0120403 A1 * | 6/2003 | Damaske | 701/34 |
| 2004/0017106 A1 * | 1/2004 | Aizawa et al. | 303/191 |
| 2005/0240319 A1 * | 10/2005 | Sawada | 701/1 |
| 2006/0041366 A1 * | 2/2006 | Kato et al. | 701/72 |
| 2006/0100766 A1 * | 5/2006 | Schwarz et al. | 701/71 |

FOREIGN PATENT DOCUMENTS

| | | |
|---|---|---|
| JP | 10-142256 A | 5/1998 |

\* cited by examiner

LATERAL ACCELERATION SENSOR BREAKDOWN DETECTION DEVICE

FIELD OF THE INVENTION

The present invention relates to a breakdown detection device for a lateral acceleration sensor that detects the lateral acceleration (hereafter also referred to as the lateral G, where 'G' means acceleration) acting on a vehicle.

BACKGROUND OF THE INVENTION

Conventionally, four wheel drive vehicles that have a drive power distribution control device that optimally distributes the drive power transmitted to the wheels, based on the lateral G measured by a lateral G sensor are known. If the lateral G sensor in this vehicle is faulty, it is not possible to appropriately distribute the drive power, so sometimes a breakdown detection device is provided. When a breakdown is detected by the breakdown detection device, a predetermined fail safe operation is carried out (see for example, Japanese Patent Publication No. H7-40040). This fail safe operation can include suspending control of distribution of drive power and running as a two wheel drive vehicle, or controlling the engine to reduce the output. Also, a warning light is lit to alert the driver that a fail safe operation has been carried out.

A breakdown detection device that determines that the lateral G sensor has a breakdown when the absolute value of the difference between the actual lateral G and the estimated lateral G calculated from various parameters expressing the vehicle condition is equal to or greater than a predetermined value (for example, see Japanese Patent Application Laid-open No. H10-142256) is known. At this time, when running with the wheels gripping the road surface and rotating normally, the yaw rate increases and decreases together with the lateral G, so it is also possible to calculate the estimated lateral G based on the yaw rate measured by a yaw rate sensor.

However, a problem that can arise when running on a road surface with a low coefficient of friction due to snow or ice is that if the vehicle spins by oversteering while turning, the actual lateral G reduces but the yaw rate increases. At this time it is easy for load to be applied to the outer wheels, but the inner wheels slip, so the rotation speed of the outer wheels becomes equal to or less than the rotation speed of the inner wheels. When the yaw rate does not follow the increase and decrease of the lateral G in this way, it is not possible to accurately calculate the estimated lateral G. Therefore, even if the lateral G sensor is normal, the difference between the actual lateral G and the estimated lateral G increases, and there is the possibility of incorrectly determining that the lateral G sensor has a breakdown. Also, when it has been incorrectly determined that the lateral G sensor has a breakdown, the fail safe operation will implemented incorrectly. If the fail safe operation has been carried out, the driver may drive to a place where the lateral G sensor can be repaired, and start the operation to repair the breakdown, even though the lateral G sensor is normal. This will cause the driver and repair person unnecessary time and effort, which is a problem from the point of view of serviceability of the vehicle.

SUMMARY OF THE INVENTION

It is an object of the present invention to provide a lateral acceleration sensor breakdown detection device that does not falsely diagnose a breakdown.

The lateral acceleration sensor breakdown detection device according to the present invention is a lateral acceleration sensor breakdown detection device configured to carry out a breakdown determination control for determining that the lateral acceleration sensor has a breakdown when the difference between the actual lateral acceleration acting on a four wheel drive vehicle measured by the lateral acceleration sensor installed on the vehicle and the estimated lateral acceleration calculated from predetermined parameters that express the condition of the vehicle, wherein, while the vehicle is turning, when the rotation speed of the outer wheel from among the left and right wheels is equal to or less than the rotation speed of the inner wheel from among the left and right wheels, and when the actual lateral acceleration is less than the estimated lateral acceleration and their difference is equal to or greater than a predetermined value, the breakdown determination control is suspended.

At this time, preferably the estimated lateral acceleration is estimated and calculated based on the yaw rate acting on the four wheel drive vehicle measured by a yaw rate sensor installed on the four wheel drive vehicle. Also, preferably the lateral acceleration sensor breakdown detection device is provided in a drive power distribution control device of the four wheel drive vehicle for carrying out control of the distribution of drive power transmitted to the front and rear wheels, or the left and right wheels, based on the actual lateral acceleration.

According to the lateral acceleration sensor breakdown detection device of the present invention, when it is determined that spinning by oversteering has occurred, the breakdown determination control is suspended, and even though the difference between the actual lateral G and the estimated lateral G is equal to or greater than the predetermined value, it is not determined that the lateral G sensor has a breakdown. Therefore, when there is the possibility that the estimated lateral G cannot be accurately estimated because of the spin, erroneous determination of a breakdown based on this inaccurately estimated lateral G is eliminated. Therefore it is possible to provide a lateral acceleration sensor breakdown detection device with high operational reliability.

The breakdown detection device configured to be capable of suspending the breakdown determination control in this way is very effective if the estimated lateral G is calculated based on the yaw rate. In other words, under normal conditions the estimated lateral G can be accurately calculated from the yaw rate which follows the actual lateral G, so the breakdown determination control can be accurately carried out. During spin conditions, the tendency of the yaw rate (estimated lateral G) to increase and decrease is the reverse of that of the actual lateral G, but the breakdown determination control is suspended, so erroneous determination that a breakdown occurred is eliminated.

Also, by providing the breakdown detection device in the drive power distribution control device of the four wheel drive vehicle, which carries out control based on the actual lateral G, erroneous activation of the fail safe operation of the drive power distribution control device can be eliminated, and it is possible to provide a drive power distribution control device with high operational reliability. Furthermore, by eliminating erroneous activation of the fail safe operation in this way, it is possible to eliminate the unnecessary time and effort that was potentially required with the conventional configuration. Therefore, it is possible to provide a four wheel drive vehicle that is useful from the serviceability point of view.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 1:
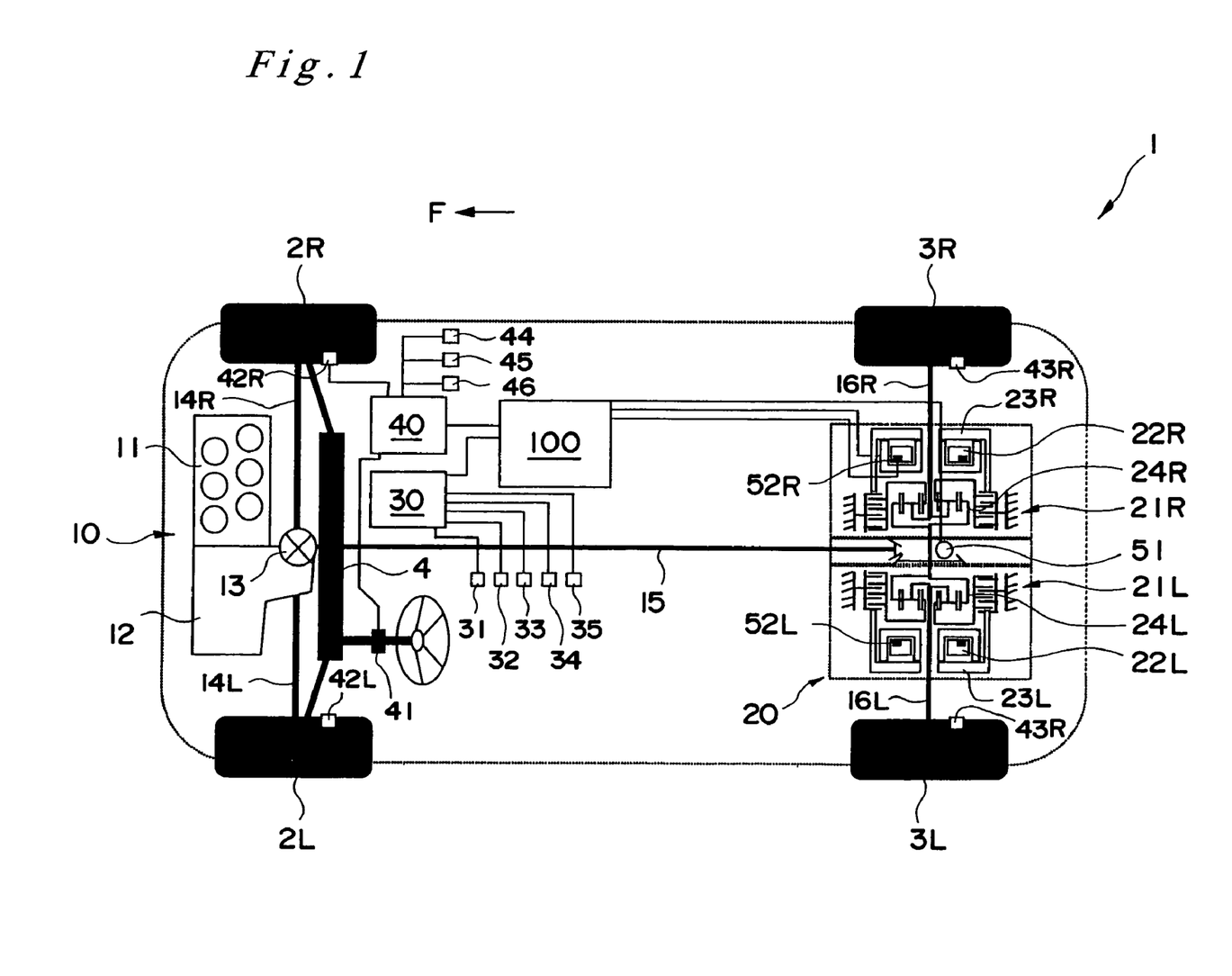
FIG. 1 is a schematic plan diagram showing the structure of a four wheel drive vehicle having a lateral acceleration sensor breakdown detection device according to the present invention.

The following is an explanation of the preferred embodiments of the present invention, with reference to the drawings. FIG. 1 shows a four wheel drive vehicle 1 installed with a lateral acceleration sensor breakdown detection device according to the present invention. In the following, the direction of the arrow F in the drawing is the forward direction. In the vehicle 1, a power unit 10 that generates drive power that is distributed to left and right front wheels 2L, 2R and left and right rear wheels 3L, 3R includes an engine 11 disposed in the front of the vehicle 1, a transmission 12 that transforms and outputs the rotational drive power from the adjacent engine 11, a differential gear mechanism 13 disposed between the left and right front wheels 2L, 2R, that is connected to the output shaft (not shown in the drawings) of the transmission 12 via a speed reducing gear train (not shown in the drawings), left and right front axle shafts 14L, 14R connected between the differential gear mechanism 13 and the front wheels 2L, 2R, a propeller shaft 15 connected to the differential gear mechanism 13 and that extends to the rear, left and right rear axle shafts 16L, 16R connected to the rear wheels 3L, 3R and also connected to the propeller shaft 15 via a drive power distribution mechanism 20.

The engine 11 is a reciprocating engine using gasoline or similar as fuel. The engine 11 includes injectors (not shown in the drawings) that can be controlled by electrical actuation, and an air intake throttle (not shown in the drawings). The fuel injection quantity and the fuel injection timing can be controlled, and the air intake quantity can be adjusted independently by the degree of opening of an accelerator pedal operated by the driver. The transmission 12 is an automatic transmission having a plurality of power transmission paths (not shown in the drawings) connected between the input and output shafts having mutually different gear change ratios. A power transmission path with an appropriate gear change ratio is automatically selected in accordance with the vehicle conditions. The elements forming the power transmission paths may include parallel shafts and gear trains, or epicyclic gear mechanisms, or combinations of these elements. A torque converter (not shown on the drawings) and a lock up mechanism (not shown on the drawings) are disposed between the output shaft (not shown on the drawings) of the engine 11 and the input shaft (not shown on the drawings) of the transmission 12.

The drive power control device 20 includes multiple disk type brake clutches 21L, 21R; coils 22L, 22R and armatures 23L, 23R that activate the brakes of the brake clutches 21L, 21R; and epicyclic gears 24L, 24R connected to the rear axle shafts 16L, 16R respectively. When current is output from a 4WD control device 100 that is explained later, electromagnetic force is generated in the coils 22L, 22R in accordance with the value of the current. When the armatures 23L, 23R are activated by the electromagnetic force generated in the coils 22L, 22R, the brake clutches 21L, 21R are engaged by an engaging force in accordance with the electromagnetic force, and clutch torque is generated in accordance with the engaging force. The clutch torque is increased by the epicyclic gears 24L, 24R, output to the rear axle shafts 16L, 16R, and transmitted to the left and right rear wheels 3L, 3R. When there is no current output to the coils 22L, 22R, the brake clutches 21L, 21R are released, and drive power is not distributed to the rear wheels 3L, 3R. In other words, the drive power distribution ratio between the front wheels 2L, 2R and the rear wheels 3L, 3R, and the drive power distribution ratio between the left and right rear wheels 3L, 3R are simultaneously controlled in accordance with the value of the drive current output to the coils 22L, 22R from the drive power control device 20.

The power unit 10 inputs rotational drive power output from the engine 11 to the transmission 12 via the torque converter and the lock up mechanism. The transmission 12 transforms the rotational drive power input to the input shaft in accordance with the gear change ratio of the power transmission path selected, and transmits the power to the output shaft. The rotational drive power output from the transmission 12 is input to the differential gear mechanism 13 via the reducing gear train, and is transmitted to the front wheels 2L, 2R and the rear wheels 3L, 3R via the front axle shafts 14L, 14R, the propeller shaft 15, the drive power distribution mechanism 20, and the rear axle shafts 16L, 16R with a distribution ratio that varies in accordance with the vehicle conditions, whereby the vehicle 1 is driven. Also, the vehicle 1 includes a steering device 4 that controls the direction of travel by changing the direction of the left and right front wheels 2L, 2R, which are the wheels used for steering.

The vehicle 1 also includes an FI/AT control device 30 that controls the output of the engine 11 and controls the automatic gear change of the transmission 12, by carrying out operation control of the engine 11 and the transmission 12; an ESC control device 40; and the 4WD control device 100 that controls the distribution of drive power between the front and rear wheels and the left and right wheels by controlling the operation of the drive power distribution mechanism 20. The FI/AT control device 30 and the ESC control device 40 are connected to the 4WD control device 100.

The engine rotation speed (the rotation speed of the output shaft of the engine 11) Ne measured by an engine rotation speed sensor 31, the input shaft rotation speed (rotation speed of the input shaft of the transmission 12) Nm measured by a transmission input shaft rotation speed sensor 32, the gear speed set in the transmission 12 measured by a gear position sensor 33, the air flow rate $G_1$ into the air intake system (that has passed the air cleaner) of the engine 11 measured by an air flow meter 34, and the air pressure $P_1$ within the air intake pipe of the engine 11 measured by an intake air pressure sensor 35 are input to the FI/AT control device 30. The FI/AT control device 30 calculates the quantity of air in the cylinders (the quantity of air taken into the cylinders of the engine 11) Gaircyl, based on the air flow rate $G_1$ and the air pressure $P_1$.

The steering angle of the steering device 4 measured by a steering angle sensor 41, the rotation rate of each wheel 2L, 2R, 3L, 3R measured by wheel speed sensors 42L, 42R, 43L, 43R, the yaw rate acting on the vehicle 1 measured by a yaw rate sensor 44, the actual lateral acceleration acting on the vehicle 1 measured by a lateral acceleration sensor 45, the longitudinal acceleration (also referred to as longitudinal G) acting on the vehicle 1 measured by a longitudinal acceleration sensor 46, and so on, are input to the ESC control device 40. The steering angle sensor 41 is installed on the steering device 4, the wheel speed sensors 42L, 42R, 43L, 43R are installed on the corresponding wheels 2L, 2R, 3L, 3R, the yaw rate sensor 44, the lateral G sensor 45, and the longitudinal G sensor 46 are installed at appropriate locations on the vehicle.

Figure 2:
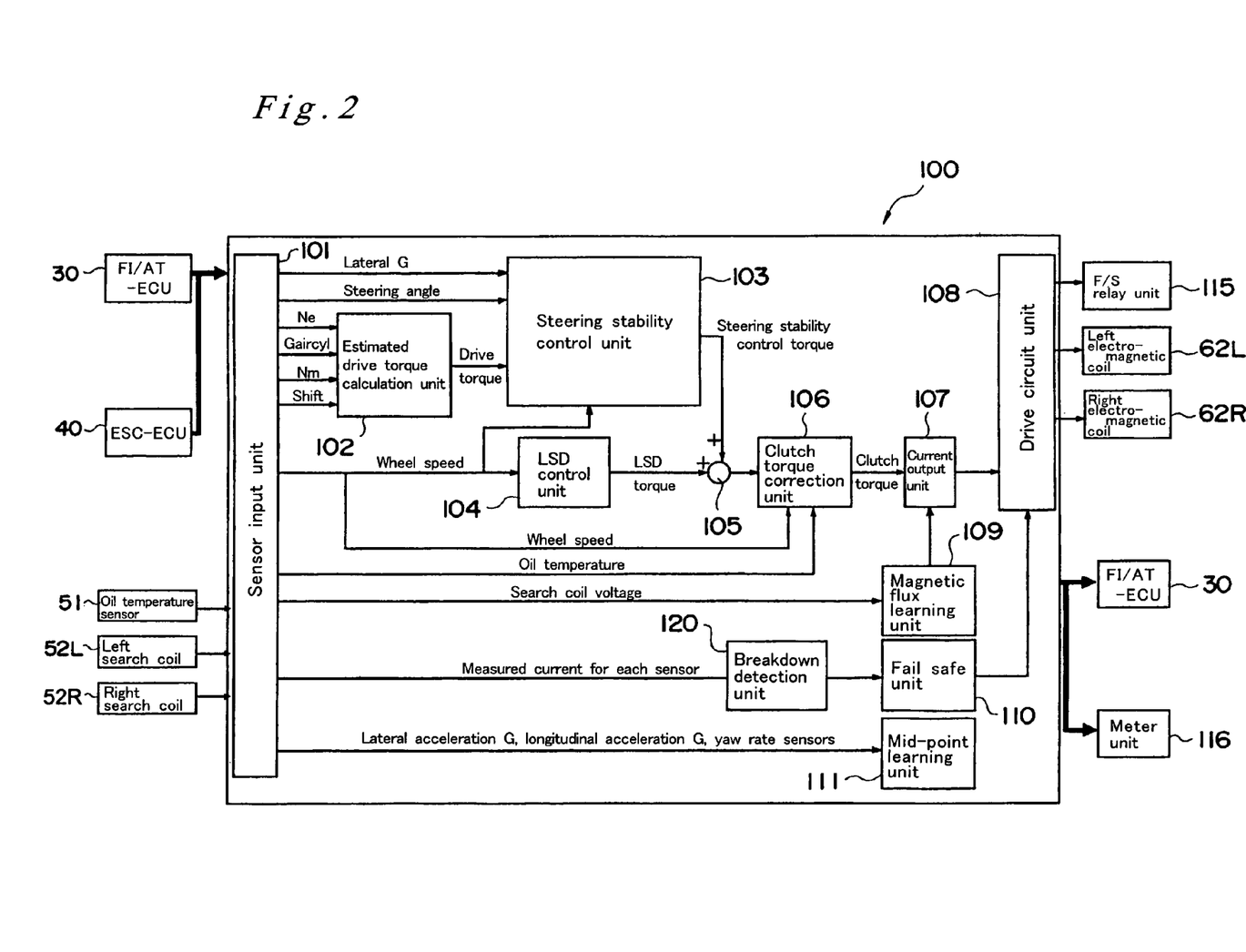
FIG. 2 is a configuration diagram for the 4WD control device.

Various types of information (parameters) that express the condition of the vehicle are input to a sensor input unit 101 of the 4WD control device 100 shown in FIG. 2. For example, from the FI/AT control device 30, the engine rotation speed Ne, the input shaft rotation speed Nm, the gear speed, and the quantity of air in the cylinders Gaircyl are input. From the ESC control device 40 the steering angle, the wheel speeds, the actual yaw rate, the actual lateral G, and the actual longitudinal G are input. Also, the temperature of hydraulic oil supplied to the drive power distribution mechanism 20 measured by an oil temperature sensor 51, and the air gaps between the coils 22L, 22R and to the armatures 23L, 23R respectively measured by search coils 52L, 52R are input.

An estimated drive torque calculation unit 102 calculates the estimated drive torque input to the differential gear mechanism 13 based on the engine rotation speed Ne, the input shaft rotation speed Nm, the quantity of air in the cylinders Gaircyl, and the gear speed (the gear speed ratio corresponding to the gear speed) input from the sensor input unit 101, and outputs the calculated estimated drive torque to a steering stability control unit 103. The steering stability control unit 103 calculates a steering stability control torque based on the steering angle, actual lateral G, and wheel speeds from the sensor input unit 101, and the estimated drive torque from the estimated drive torque calculation unit 102. The calculated steering stability torque is output to a torque addition unit 105. The steering stability torque calculated by the steering stability control unit 103 is the basic value of the distribution of drive power to each of the wheels 2L, 2R, 3L, 3R (in other words, the distribution ratios of the drive power distributed to the wheels).

An LSD control unit 104 calculates an LSD torque to activate the limited step effect when necessary, based on the wheel speeds from the sensor input unit 101, and outputs the calculated LSD torque to the torque addition unit 105. The torque addition unit 105 corrects the steering stability control torque by adding the LSD torque from the LSD control unit 104 to the steering stability control torque from the steering stability control unit 103, and outputs the corrected steering stability control torque to a clutch torque correction unit 106. The clutch torque correction unit 106 calculates the clutch torque generated by the drive power distribution mechanism 20, based on the wheel speeds and hydraulic oil temperature from the sensor input unit 101 and the steering stability control torque from the torque addition unit 105, and outputs the calculated clutch torque to a current output unit 107. The current output unit 107 calculates the value of the drive current to be output to the coils 22L, 22R, based on the clutch torque output from the clutch torque correction unit 106, and outputs the calculated values of current to a drive circuit unit 108. The drive circuit unit 108 outputs the values of current input from the current output unit 107 to the coils 22L, 22R. In this way, drive power distribution between the wheels 2L, 2R, 3L, 3R is carried out in accordance with the vehicle conditions.

A magnetic flux learning unit 109 calculates a current correction value, based on the air gaps from the sensor input unit 101, and outputs the calculated current correction values to the current output unit 107. The current output unit 107 corrects the current value so that the required electromagnetic force can be obtained, based on the current correction values, and outputs the current values to the drive circuit unit 108. Also, the mid-points of the yaw rate sensor 44, the lateral G sensor 45, and the longitudinal G sensor 46 are learned by a mid-point learning unit 111.

However, the 4WD control device 100 calculates the steering stability torque based on the actual lateral G. Therefore if the lateral G sensor 45 is not operating properly, it is not possible to appropriately control the drive power distribution. Therefore, the 4WD control device 100 includes a breakdown detection unit 120 that detects the breakdown of various sensors, in particular the lateral G sensor 45, based on various information from the sensor input unit 101. When the breakdown detection unit 120 detects a breakdown, a predetermined fail safe operation is carried out by a fail safe unit 110. In the vehicle 1, a fail safe signal is output from the fail safe unit 110 to the drive circuit unit 108. Then relay drive current is output to a F/S relay unit 115 from the drive circuit unit 108 to which the fail safe signal was input, and the F/S relay unit 115 operates so that current does not flow to the coils 22L, 22R. In this way, the brake clutches 21L, 21R are released, and drive power is not distributed to the rear wheels 3L, 3R. Furthermore, a torque down request signal is output from the fail safe unit 110 to the FI/AT control device 30, so the quantity of fuel injected and the intake air flow rate are reduced by the FI/AT control device 30, so the output of the engine 11 is reduced. Furthermore, a warning display signal is output from the fail safe unit 110 to a meter unit 116 within the driver's compartment, and a warning light in the meter unit 116 is lit. Also, the fail safe unit 110 outputs error codes that indicate the location and details of the breakdown to a recording unit (not shown in the drawings) in the 4WD control device 100. The error codes are recorded in the recording unit.

In this way, the driver can easily see that a fail safe operation has been carried out (some kind of fault has occurred in the vehicle 1) by observing that the warning light in the meter unit 116 is lit. When the fail safe operation has been carried out, the driver must drive to a place where the breakdown can be repaired in the fail safe state (in other words, in the two front wheel drive condition). When the vehicle 1 is driven to this place, the error codes are read from the recording unit of the 4WD control device 100, so that the breakdown location and details can be determined. Then the breakdown repair operation is carried out by replacing the parts, and carrying out an operation test. In this way, the 4WD control device 100 is configured so that even if the ignition switch of the vehicle 1 is turned off, the error codes in the recording unit remain recorded.

Figure 3:
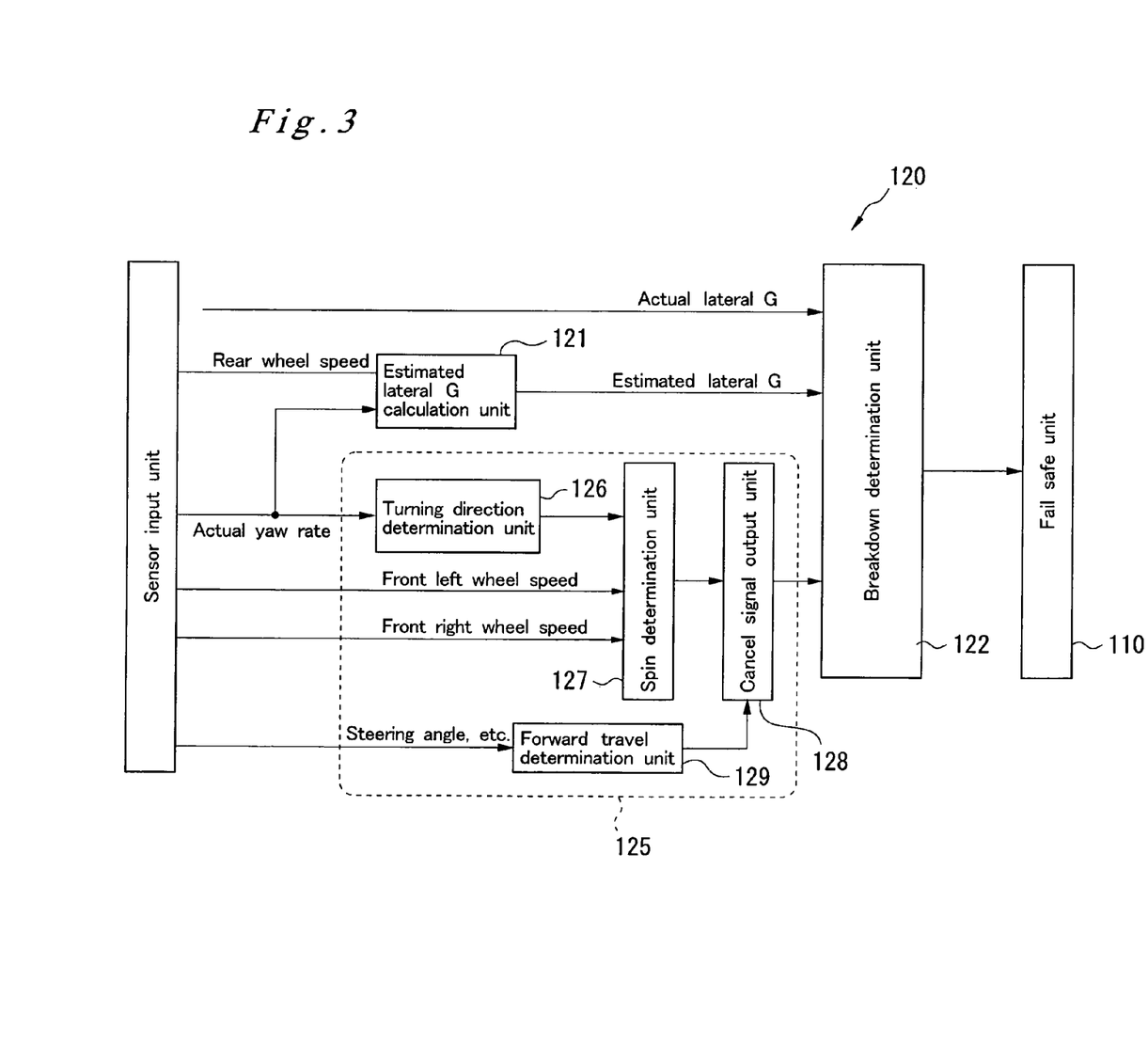
FIG. 3 is a configuration diagram for the breakdown detection unit of the 4WD control device.

The following is an explanation of the part that detects a breakdown of the lateral G sensor 45 in the breakdown detection unit 120. As shown in FIG. 3, the breakdown detection unit 120 in respect of the lateral G sensor 45 includes an estimated lateral G calculation unit 121 that calculates the estimated lateral G, and a breakdown determination unit 122 that determines whether the lateral G sensor 45 has a breakdown or not. The breakdown determination unit 122 is configured to carry out a determination process assuming that the yaw rate sensor 44 and other sensors are normal. In the following, the explanation is provided for the case where there is assurance that, apart from the lateral G sensor 45, the other sensors are operating normally.

The estimated lateral G calculation unit 121 calculates the estimated lateral G based on the actual yaw rate from the sensor input unit 101 and the wheel speeds of the rear wheels 3L, 3R. The estimated lateral G is proportional to the input parameters, which are the actual yaw rate and the wheel speeds of the rear wheels 3L, 3R.

Figure 4:
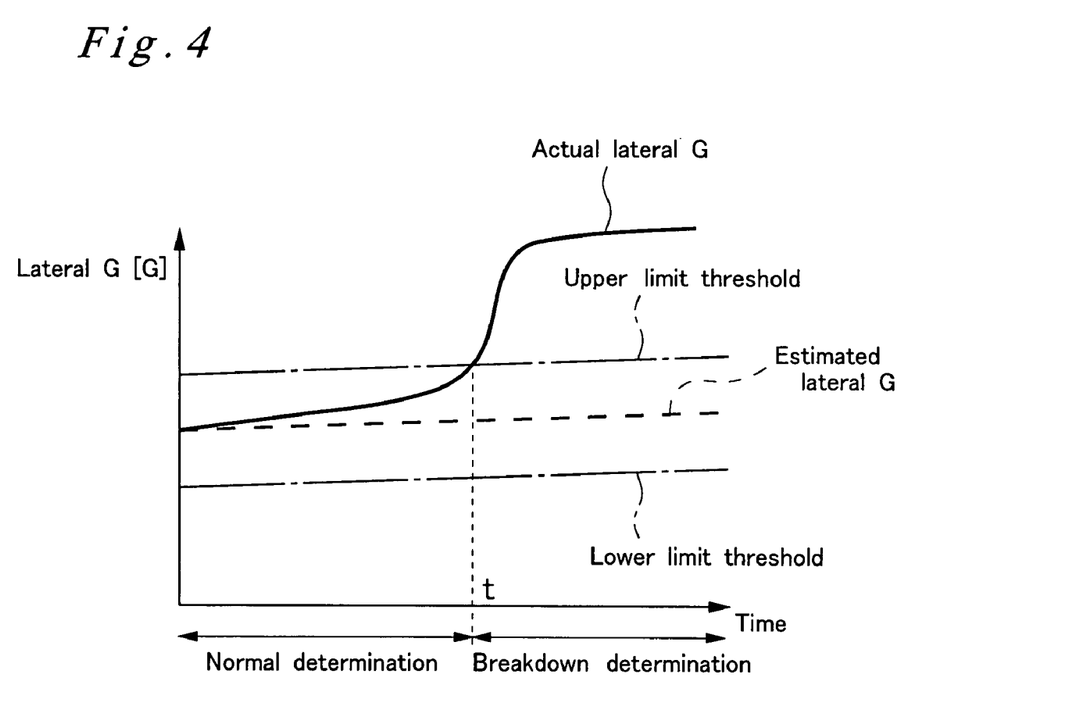
FIG. 4 is a graph explaining the details of the breakdown determination process of the breakdown detection unit.

The breakdown determination unit 122 carries out a breakdown determination control by comparing the actual lateral G from the sensor input unit 101 and the estimated lateral G from the estimated lateral G calculation unit 121. If the absolute value of the difference of the two is equal to or greater than a predetermined value, it is determined that the lateral G sensor 45 has a breakdown. In other words, in the breakdown determination control, the predetermined value is added to the estimated lateral G to set an upper limit threshold, and the predetermined value is subtracted from the estimated lateral G to set a lower limit threshold, as shown in FIG. 4. If the actual lateral G is within the range of both threshold values, it is determined that the lateral G sensor 45 is normal (see prior to the time t). When the actual lateral G is not less than the upper limit or not more than the lower limit, it is determined that the lateral G sensor 45 has a breakdown (see after the time t). If it is determined by the breakdown determination unit 122 that the lateral G sensor 45 has a breakdown, the breakdown determination unit 122 outputs a command signal to the fail safe unit 110, and the fail safe operation is carried out.

This method of determining a breakdown uses the characteristic of the yaw rate that it increases and decreases in accordance with the lateral G. This method is capable of correctly determining whether or not the lateral G sensor 45 has a breakdown during normal running when the wheels 2L, 2R, 3L, 3R are gripping the road surface. However, depending on the vehicle conditions, the tendencies of the lateral G and the yaw rate to increase and decrease can be reversed, and in this case, even if the lateral G sensor 45 is correctly measuring the actual lateral G, the difference between the actual lateral G and the estimated lateral G increases, so it is possible that the breakdown determination unit 122 will incorrectly determine that there has been a breakdown. This type of incorrect determination causes incorrect operation of the fail safe operation, which can cause unnecessary time and effort by the driver and the person that repairs the breakdown.

In order to eliminate this type of incorrect operation, the breakdown detection unit 120 is configured to suspend the breakdown determination control under the conditions where the tendencies to increase and decrease of the lateral G is reversed compared with that of the yaw rate. The breakdown detection unit 120 includes a cancel determination unit 125 that determines whether these conditions are satisfied or not, and if it is determined that the conditions are satisfied, the cancel determination unit 125 instructs the breakdown determination unit 122 to suspend the breakdown determination control.

Figure 5:
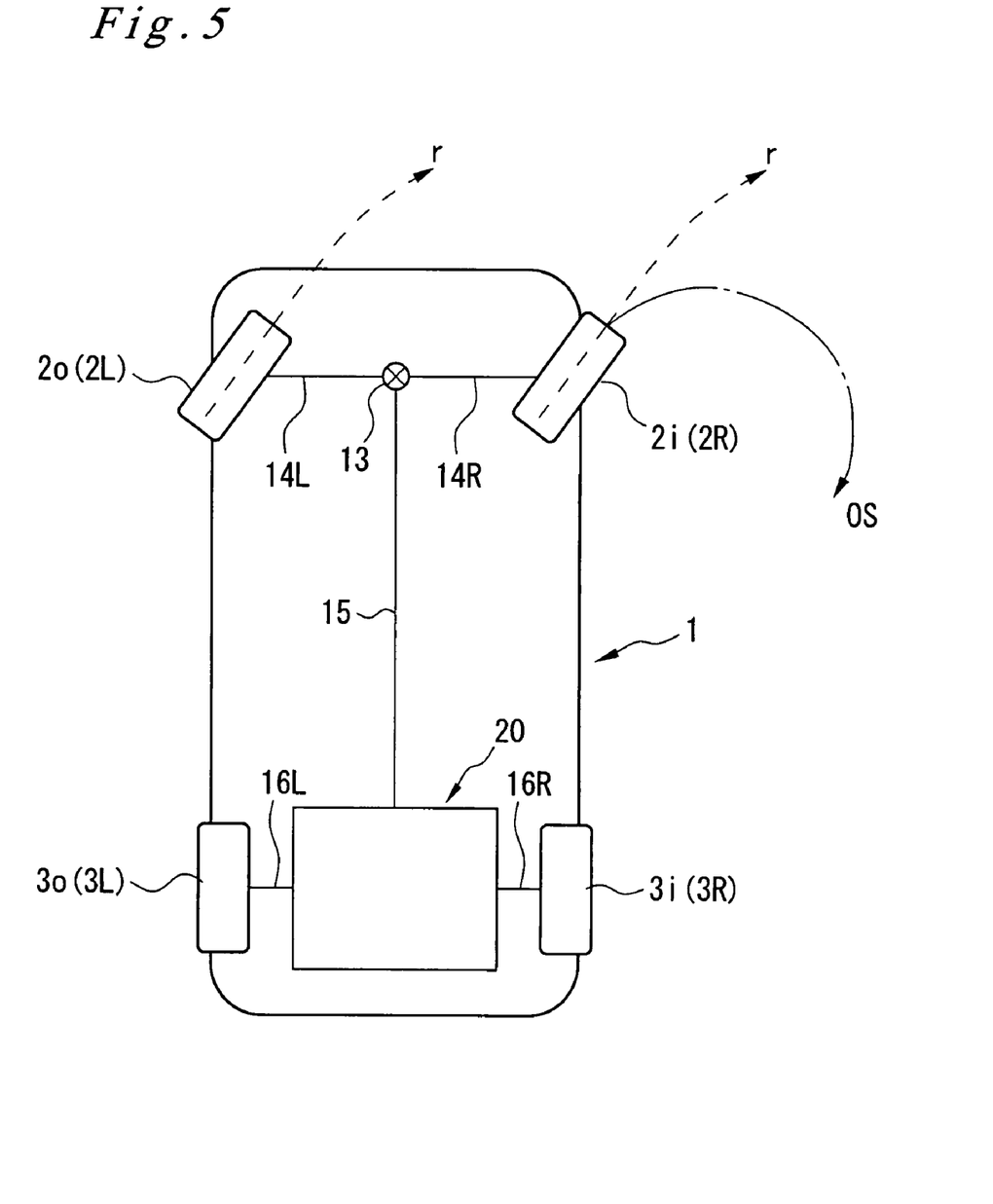
FIG. 5 is a schematic view of a four wheel drive vehicle turning.

In the present embodiment, as shown in FIG. 5, it is assumed that these conditions are when the vehicle 1 spins by oversteering (see the dashed dotted arrow line OS) when the vehicle 1 is turning in a specific direction (see the broken lines r). When this type of spin occurs, it is known that although the yaw rate increases, the lateral G decreases.

As shown in FIG. 3, the cancel determination unit 125 includes a turning direction determination unit 126 that determines the direction of turning of the vehicle 1, and a spin determination unit 127 that determines whether spinning by oversteering has occurred or not.

The turn direction determination unit 126 determines the turn direction of the vehicle 1 based on the actual yaw rate from the sensor input unit 101. If the actual yaw rate is greater than or equal to a positive predetermined value, it is determined that the turning direction is to the right. If the actual yaw rate is less than or equal to a negative predetermined value, it is determined that the turning direction is to the left. Also, when the actual yaw rate is between the two predetermined values, it is determined that the vehicle is traveling virtually straight.

The spin determination unit 127 compares the rotation speed of the left and right front wheels 2L, 2R from the sensor input unit 101, and determines whether the vehicle 1 is spinning by oversteering, based on the results of the comparison and information on the turning direction of the vehicle 1 input from the turn direction determination unit 126. The spin determination unit 127 is configured to carry out this determination process repeatedly at predetermined time intervals (for example, one second).

Here, when turning to the right, as shown in FIG. 5, the left wheels 2L, 3L are the outer wheels 2o, 3o, and the right wheels 2R, 3R are the inner wheels 2i, 3i. Conversely, when turning to the left, the right wheels 2R, 3R are the outer wheels, and the left wheels 2L, 3L are the inner wheels. When each wheel 2L, 2R, 3L, and 3R is gripping the road surface, as for the left and right front wheels 2L, 2R, the rotation speed of the outer wheel 2o is greater than the rotation speed of the inner wheel 2i, as a result of the action of the differential gear mechanism 13. On the other hand, when spinning by oversteering, on the front side the torque load is concentrated on the outer wheel 2o via the differential gear mechanism 13. Also, conversely on the front side the torque is reduced to the inner wheel 2i. Therefore, the rotation speed of the front outer wheel 2o tends to be less than the rotation speed of the other wheels. Also, conversely the front inner wheel 2i can easily skid, and the rotation speed increases. In this way, unlike during normal turning, when spinning by oversteering, the rotation speed of the outer wheel 2o from among the left and right front wheels 2L, 2R is not more than the rotation speed of the inner wheel 2i from among the left and right front wheels 2L, 2R.

When the turning direction determination unit 126 determines that the vehicle 1 is turning to the right, the spin determination unit 127 determines that the vehicle 1 is spinning by oversteering when the rotation speed of the front left wheel 2L (in other words, the outer wheel 2o) is not more than the rotation speed of the front right wheel 2R (in other words, the inner wheel 2i). Also, when the turning direction determination unit 126 determines that the vehicle 1 is turning to the left, the spin determination unit 127 determines that the vehicle 1 is spinning by oversteering when the rotation speed of the front right wheel 2R (in other words, the outer wheel 2o) is not more than the rotation speed of the front left wheel 2L (in other words, the inner wheel 2o.

When the spin determination unit 127 determines that the vehicle 1 is spinning by oversteering, a determination signal is output to a cancel signal output unit 128. When the determination signal is input from the spin determination unit 127, the cancel signal output unit 128 outputs a suspension command signal to the breakdown determination unit 122. When the breakdown determination unit 122 receives the suspension command signal, a determination suspension flag is set, and while the determination suspension flag is set the breakdown determination unit 122 suspends the breakdown determination control.

Figure 6:
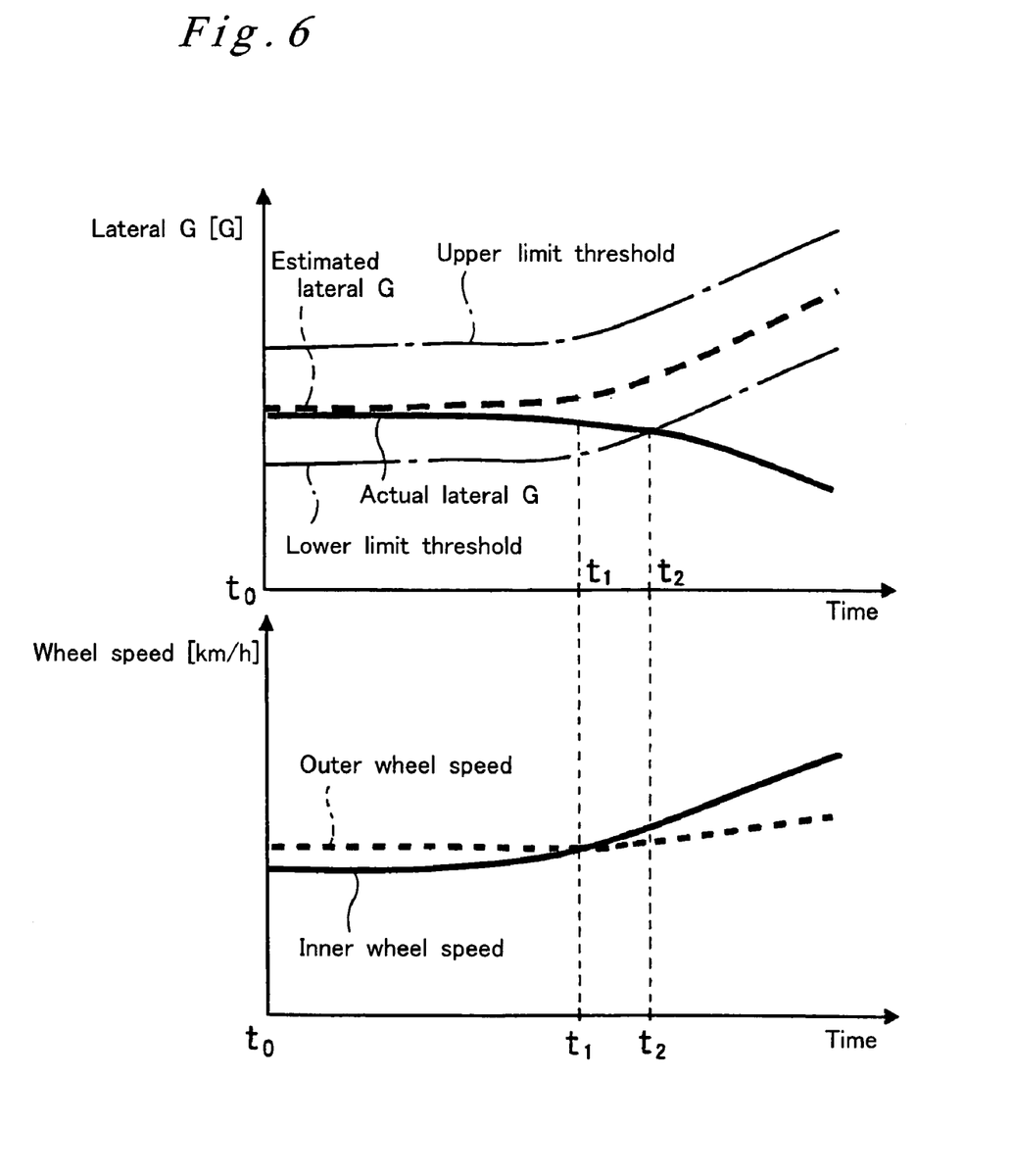
FIG. 6 is a graph explaining the conditions for suspending the breakdown determination control carried out by the breakdown detection unit.

FIG. 6 shows the variation in actual lateral G and the estimated lateral G, and the variation in rotation speed of the outer wheel 2*o* and the rotation speed of the inner wheel 2*i* to the same time axis, after the occurrence of spin by oversteering. As shown in this figure, after spinning by oversteering occurs when turning (time $t_0$), the rotation speed of the outer wheel 2*o* remains virtually constant. In contrast, the rotation speed of the inner wheel 2*i* gradually increases. Also, the estimated lateral G gradually increases, whereas the actual lateral G gradually reduces. Also, when a specific period of time $t_1$ has passed after the occurrence of spinning, the rotation speed of the outer wheel 2*o* becomes not more than the rotation speed of the inner wheel 2*i*. In this way, the suspension command signal is output from the cancel signal output unit 128 (cancel determination unit 125). After receiving the suspension command signal, the breakdown determination unit 122 sets the determination suspension flag, and suspends the breakdown determination control.

Also, as the actual lateral G further reduces and the estimated lateral G increases, eventually at the time $t_2$ the actual lateral G becomes not more than the lower limit threshold (the actual lateral G becomes lower than the estimated lateral G, and the absolute value of the difference becomes not less than a predetermined value). At this time, the breakdown determination unit 122 would normally determine that the lateral G sensor 45 had a breakdown. However, the breakdown determination control is suspended, so it is not determined that the lateral G sensor 45 has a breakdown, and the fail safe operation is not carried out.

When the spin determination unit 127 determines that spinning by oversteering while turning has ceased, based on the correlation of the rotation speeds of the outer wheel 2*o* and the inner wheel 2*i* and the value of the yaw rate, a non-spin determination signal is output to the cancel signal output unit 128. The spin determination unit 127 repeatedly carries out the determination process at predetermined intervals as described above. However, the cancel signal output unit 128 is capable of counting the number of non-spin determination signals that have been output. Also, the breakdown detection unit 120 has a forward travel determination unit 129. The forward travel determination unit 129 determines whether the vehicle 1 has prepared to travel forward (in other words, has emerged from the spinning state), based on the steering angle from the sensor input unit 101, the actual yaw rate, and other information. If the forward travel determination unit 129 determines that preparations for forward travel have been made, a forward travel preparation signal is output to the cancel signal output unit 128. When the number of times the non-spin determination signal has been input from the spin determination unit 127 reaches a predetermined number n (in other words, when (n−1) times the time interval that the spin determination unit 127 carries out the determination process has passed (for example, five seconds) since the spin determination unit 127 has determined that spinning has ceased), and the forward travel preparation signal has been input from the forward travel determination unit 129, the cancel signal output unit 128 outputs a suspension release signal to the breakdown determination unit 122. After receiving the suspension release signal, the breakdown determination unit 122 cancels the determination suspension flag, and restores implementation of the breakdown determination control. In this way, the suspension of the breakdown determination control is not cancelled until these two conditions are fulfilled, and the breakdown determination control is not restarted until the vehicle has positively ceased to spin.

According to the breakdown detection unit 120 with the configuration as described above, the breakdown determination control is suspended when it is determined that the vehicle 1 is spinning by oversteering. In this way, when it may not be possible to accurately calculate the estimated lateral G due to spin, erroneous determination of a breakdown based on an inaccurately estimated lateral G is eliminated, so it is possible to carry out highly reliable detection of breakdown of the lateral G sensor 45. In this configuration, the actual yaw rate measured by the yaw rate sensor 44 and other parameters are used for calculating the estimated lateral G, which is effective when the tendency to increase or decrease is reversed compared with that of the actual lateral G when spinning by oversteering occurs.

Also, by providing the breakdown detection unit 120, for which the risk of false determination is reduced in this way, in the 4WD control device 100 that carries out control to distribute drive power to the wheels 2L, 2R, 3L, 3R based on the actual lateral G, the risk of erroneous operation of the fail safe unit 110 is reduced, so it is possible to provide a 4WD control device 100 with high reliability. Furthermore, because erroneous fail safe operation is eliminated in this way, it is possible to eliminate the unnecessary time and effort spent by the driver and breakdown repair personnel after the fail safe operation has been erroneously activated. Therefore it is possible to provide a vehicle 1 that is useful from the serviceability point of view.

The turning direction determination unit 126 determines the turning direction based on the yaw rate measured by the yaw rate sensor 44. The reason for this configuration is because when spinning by oversteering occurs, it is assumed that the driver will countersteer, so it is very likely that the steering angle of the steering device 4 and the turning direction (the spin direction) of the vehicle 1 will not agree. In this way, by using the actual yaw rate instead of the steering angle, it is possible to accurately determine the turning direction of the vehicle 1 by the turning direction determination unit 126 of the cancel determination unit 125 that determines whether spin has occurred or not.

An embodiment of a breakdown detection device for a lateral acceleration sensor according to the present invention has been explained up to this point. However, the present invention is not necessarily limited to the configuration described above. For example, when the suspension command signal is output from the cancel signal output unit 128, the breakdown determination unit 122 completely suspends the breakdown determination control. However, the breakdown determination control may be suspended only when the suspension command signal has been output and the actual lateral G has dropped to not more than the lower limit threshold value. In this way, when the suspension command signal is output, and when the actual lateral G is equal to or greater than the upper limit threshold value, this is not a reflection of the occurrence of spinning by oversteering when turning, so it is possible to determine that the lateral G sensor 45 has a breakdown. At this time it is possible to determine that the lateral G sensor 45 has a breakdown without error, so it is possible to carry out the fail safe operation.

Also, in the spin determination unit 127, a condition that the lower rotation speed of the rotation speeds of the left and right rear wheels 3L, 3R shall be equal to or greater than a predetermined value may be added as a condition for determining that spin has occurred. In this way, it is possible to more positively determine whether spinning has occurred when traveling. Furthermore, when comparing the rotation speeds of the outer wheel 2*o* and the inner wheel 2*i*, a predetermined margin may be provided for the rotation speed of the outer wheel 2*o*. For example, an embodiment in which it is determined that spin has occurred by oversteering when the rotation speed of the outer wheel 2*o* is not more than the rotation speed of the inner wheel 2*i* by a predetermined factor (for example, 1.1) may be provided. In this way, it is possible to more positively determine whether spinning has occurred or not.

Also, the breakdown detection unit 120 is provided in the 4WD control device 100 that carries out control of the distribution of drive power to the wheels 2L, 2R, 3L, 3R in the four wheel drive vehicle 1. However, the present invention is not limited to this configuration. Provided there is a device that carries out a predetermined operation control based on the actual lateral G measured by the lateral G sensor 45, by applying the present invention in the same way to this device, it is possible to improve the operational reliability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2006-172006 filed on Jun. 21, 2006, which is incorporated herein by reference.

What is claimed is:

1. A lateral acceleration sensor breakdown detection device, comprising:
   a breakdown determination controller which determines that a lateral acceleration sensor has a breakdown when a difference between an actual lateral acceleration acting on a four wheel drive vehicle measured by the lateral acceleration sensor installed on the vehicle and an estimated lateral acceleration calculated from predetermined parameters that express a condition of the vehicle,
   wherein while the vehicle is turning, the breakdown determination controller suspends a determination that the lateral acceleration sensor had the breakdown when:
      rotation speed of an outer wheel from among left and right wheels is equal to or less than rotation speed of an inner wheel from among the left and right wheels, and
      an actual lateral acceleration is less than an estimated lateral acceleration and the difference is equal to or greater than a predetermined value, and
   wherein the estimated lateral acceleration is estimated and calculated based on a yaw rate acting on the four wheel drive vehicle measured by a yaw rate sensor installed on the four wheel drive vehicle.

2. The lateral acceleration sensor breakdown detection device according to claim 1, further comprising:
   a turning direction determination unit that determines a turning direction based on an actual yaw rate acting on the four wheel drive vehicle measured by the yaw rate sensor installed on the four wheel drive vehicle; and
   wheel speed sensors that measure rotation speed of the left and right wheels,
   wherein when a determination is made by the turning direction determination unit that the vehicle is turning, the difference in the rotation speeds of the left and right wheels measured by the wheel speed sensor and the turning direction determined by the turning direction determination unit are compared, and a determination is made whether spinning of the wheels by oversteering has occurred or not.

3. The lateral acceleration sensor breakdown detection device of claim 1,
   wherein while the vehicle is turning, the breakdown determination controller suspends the determination that the lateral acceleration sensor had the breakdown when a determination is made that spinning of the wheels has occurred by oversteering.

4. The lateral acceleration sensor breakdown detection device according to claim 1 or claim 2, wherein the lateral acceleration sensor breakdown detection device is provided in a drive power distribution control device of the four wheel drive vehicle for carrying out control of the distribution of drive power transmitted to the front and rear wheels, or the left and right wheels, based on the actual lateral acceleration.

* * * * *